United States Patent [19]
Wu et al.

[11] Patent Number: 5,671,405
[45] Date of Patent: Sep. 23, 1997

[54] APPARATUS AND METHOD FOR ADAPTIVE LOGICAL PARTITIONING OF WORKFILE DISKS FOR MULTIPLE CONCURRENT MERGESORTS

[75] Inventors: Kun-Lung Wu, Yorktown Heights; Philip Shi-Lung Yu, Chappaqua, both of N.Y.

[73] Assignee: International Business Machines Corporation, Armonk, N.Y.

[21] Appl. No.: 504,160

[22] Filed: Jul. 19, 1995

[51] Int. Cl.$^6$ .................................................. G06F 7/06
[52] U.S. Cl. .................. 395/607; 395/601; 395/200.03; 395/456
[58] Field of Search ........................ 395/600, 607, 395/601, 200.03, 456

[56] References Cited

U.S. PATENT DOCUMENTS

| | | | |
|---|---|---|---|
| 4,925,311 | 5/1990 | Neches et al. | 364/200.03 |
| 5,179,699 | 1/1993 | Iyer et al. | 395/607 |
| 5,237,514 | 8/1993 | Curtin | 364/490 |
| 5,357,623 | 10/1994 | Megory-Cohen | 395/425 |
| 5,421,007 | 5/1995 | Coleman et al. | 395/607 |

OTHER PUBLICATIONS

Kun–Lung Wu, "Data Placement and Buffer Management for Concurrent Mergesorts with Parallel Prefetching", IEEE Publications, pp. 418–427 Feb. 14, 1994.

*System/390 MVS Sysplex Overview Introducing Data Sharing and Parallelism in a Sysplex*, IBM Corporation, 1994.

"The Kendall Square Query Decomposer," D. Reiner, J. Miller, and D. Wheat, *Proc. of the 2nd Parallel and Distributed Information Systems Conference*, 1993.

"The Input/Output Complexity of Sorting and Related Problems," A. Aggarwal and J.S. Vitter, *Communications of the ACM*, 31(9):1116–1127, 1988.

"Parallel Algorithms for Relational Database Operations," D.J. DeWitt, D. Bitton, H. Boral and W.K. Wilkinson, *ACM Trans. on Database Systems*, 8(3):324–353, 1983.

"System Issues in Parallel Sorting for Database Systems," B.R. Iyer and D.M. Dias, *Proc. of International Conference on Data Engineering*, pp. 246–255, 1990.

"The I/O Performance of Multiway Mergesort and Tag Sort," S.C. Kwan and J.L. Baer, *IEEE Trans. on Computers*, 34(4):383–387, 1985.

"Merging Sorted Runs Using Large Main Memory," B. Salzberg, *Acta Informatica*, 27:195–215, 1989.

*Primary Examiner*—Thomas G. Black
*Assistant Examiner*—Greta L. Robinson
*Attorney, Agent, or Firm*—Jenkens & Gilchrist

[57] ABSTRACT

System and method for improving response time of concurrent mergesort operations in an information handling system, which includes one or more logical processors each operating under control of an image of an operating system program, a database storage system for storing data in a predetermined data structure, one or more workfile storage devices for storing workfiles during mergesort operations, means for sorting the data structure into one or more ordered runs, means for determining a logical partition size for the workfile storage devices, means for selecting a least loaded partition, means for writing the ordered runs in the selected partition in the workfile storage devices, and means for merging the ordered runs into a single sorted run.

10 Claims, 3 Drawing Sheets

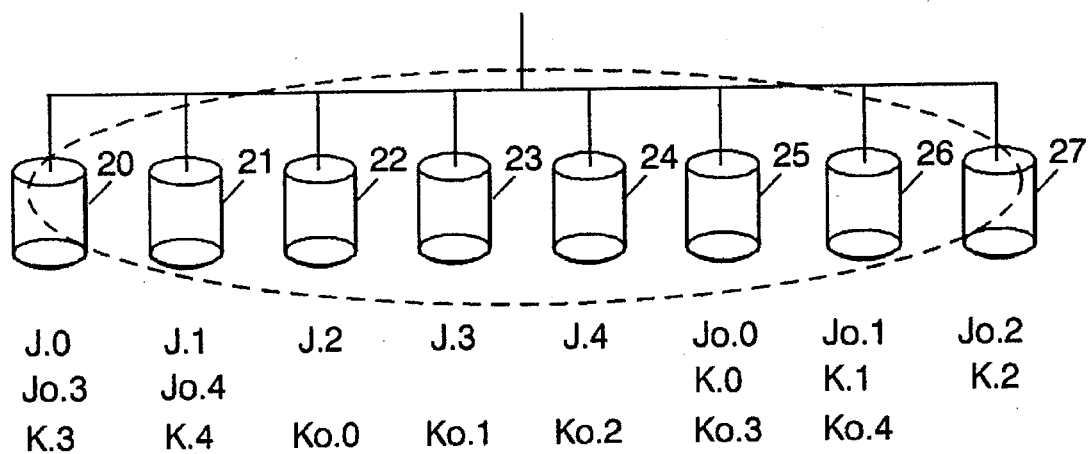
(A) ONE PARTITION
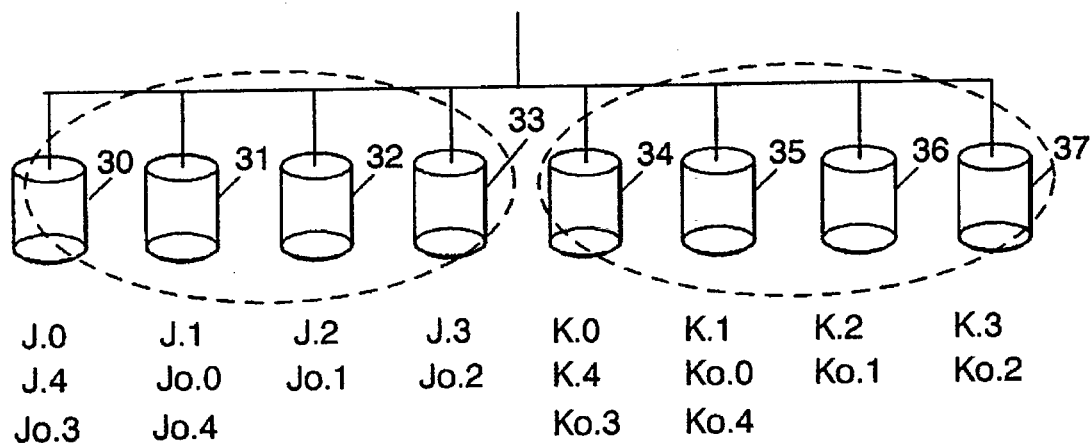
(B) TWO PARTITIONS

APPARATUS AND METHOD FOR ADAPTIVE LOGICAL PARTITIONING OF WORKFILE DISKS FOR MULTIPLE CONCURRENT MERGESORTS

FIELD OF THE INVENTION

This invention generally relates to information handling systems and, more particularly, to the management of workfile disks for efficient processing of concurrent mergesorts in a multiprocessor database system.

BACKGROUND OF THE INVENTION

One of the most time-consuming operations in query processing is the sorting of a large table (relation), which typically uses an external sort or mergesort. A mergesort involves two phases: sorting phase and merge phase. During the sorting phase, tuples in a relation are first sorted into multiple runs according to a certain key (see *The Art of Computer Programming, Vol. 3: Sorting and Searching*, by D. E. Knuth, Addison-Wesley, 1973). These initial sorted runs are referred to in the present invention as the input runs of a merge job. The input runs are temporarily stored on the workfile disks, which are disks used as the external working spaces of a database system. The files that contain these runs are called workfiles and hence the temporary working disks for mergesorts are referred to as workfile disks. During the merge phase, the input runs of a merge job are read into the buffer from the workfile disks, merged and then the merged data are written back to workfile disks in the final sorted order, referred to as the output run of the merge job. The disks for the output run may or may not be the same disks used for the input runs, depending on the total number of workfile disks.

As coupling multiple microprocessors to form a high performance machine becomes popular, more and more multiprocessor system have been used for database query processing. Examples of multiprocessor database machines for query processing can be found in *System/390MVS Sysplex Overview Introducing Data Sharing and Parallelism in a Sysplex*, IBM Corporation, 1994 and "The Kendall Square Query Decomposer," by D. Reiner, J. Miller and D. Wheat, in *Proc. of the 2nd Parallel and Distributed Information Systems Conference*, 1993. In concurrent mergesorts in a multiprocessor database system, the allocation of workfile disks to a sort job can have a significant performance impact. In order to achieve better load balancing among the disks, the runs of each mergesort should be spread evenly among all the disks. However, by sharing the disks among different concurrent mergesorts, the progress of a mergesort can be blocked by another concurrent mergesort due to an I/O interference on the same disk. For example, Job 1 can be blocked waiting for a read from a disk which is currently serving a write request from Job 2.

Unlike the interference in general file system I/O's where the requests are generally homogeneous in size and random in access pattern, the workfile disk I/O interference in concurrent mergesorts is unique and can be rather severe. Since multiple disks can be fetching the input runs in parallel and only one disk is writing the output run, many relatively large sequential write requests can be continuously issued to the same disk during the merge phase. If a read request from another job is issued to the same disk, it can be blocked for a very long time. Once one of the read requests gets blocked during a merge phase, the entire merge process gets blocked even though other read requests have been serviced by other workfile disks. Note that this problem cannot be solved simply by giving a higher priority to read requests over write requests because buffer size is limited. Once write requests get delayed, data waiting to be written to the disks start to accumulate in the buffer, leaving little space available for read requests. As a result, the merge process can also be blocked.

There are prior art publications that mainly focus on the performance of the merge phase of an external sort, such as "The Input/Output Complexity of Sorting and Related Problem," by A. Aggarwal and J. S. Vitter, in *Communications of the ACM*, 31(9):1116–1127, 1988; "Parallel Algorithms for Relational Database Operations," by D. J. DeWitt, D. Bitton, H. Boral and W. K. Wilkinson, in *ACM Trans. on Database Systems*, 8(3):324–353, 1983; "System Issues in Parallel Sorting for Database Systems," by B. R. Iyer and D. M. Dias, in *Proc. of International Conference on Data Engineering*, pp. 246–255, 1990; "The I/O Performance of Multiway Mergesort and Tag Sort," by S. C. Kwan and J. L. Baer, in *IEEE Trans. on Computers*, 34(4):383–387, 1985; and "Merging Sorted Runs Using Large Main Memory," by B. Salzberg, in *Acta Informatica*, 27:195–215, 1989. However, most of them have only dealt with a single merge job in a single system, and have not considered the interactions of concurrent merges in a multiprocessor system. Further, the placement of workfiles (runs) among the disks has not been discussed in the prior art.

SUMMARY OF THE INVENTION

It is an object of the invention to adaptively partitioning workfile disks for the placement of workfiles for efficient processing of concurrent mergesorts in a multiprocessor database system.

Accordingly, a system and method of using adaptive logical partitioning of workfile disks efficiently processes concurrent mergesorts in a multiprocessor database system. The workfile disks are logically partitioned into multiple groups and each mergesort issued from any of the processors can dynamically choose one group for placing its workfiles. The partition size, or the number of logical partitions, can by dynamically changed and is adaptive to the system workload. One indicator of system workload can be the average disk utilization. When the system workload is low, the partition size can be as large as the total number of workfile disks. Since the load is low, there is less chance for I/O interference on the same workfile disk from two different mergesorts. Thus, the advantage of load balancing can be achieved without much negative impact of I/O interference. However, as the system workload increases, the probability of I/O interference increases. As a result, a smaller partition size can be used to reduce the impact of I/O interference, and each mergesort can dynamically choose a less loaded partition to achieve the benefits of load balancing.

BRIEF DESCRIPTION OF THE DRAWINGS

FIG. 2A is a block diagram illustrating logical partitioning of workfile disks into one partition according to the present invention.

FIG. 2B is a block diagram illustrating logical partitioning of workfile disks into two partitions according to the present invention.

Like reference numerals appearing in more than one drawing depict like elements.

DETAILED DESCRIPTION OF A PREFERRED EMBODIMENT

Figure 1:
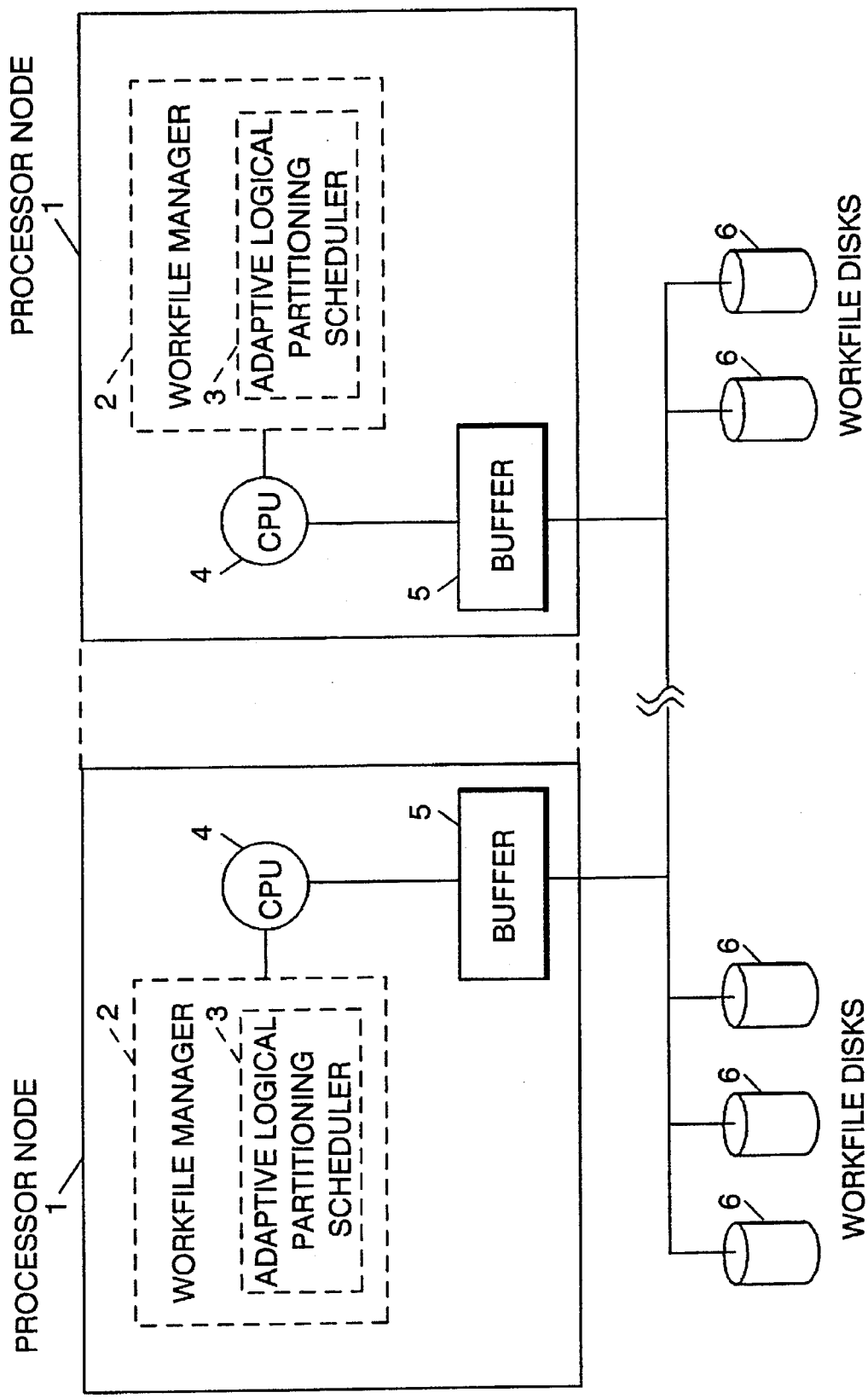
FIG. 1 is a block diagram of a multiprocessor database system with multiple workfile disks for efficient processing of concurrent mergesorts in accordance with the present invention.

Referring now to FIG. 1, a multiprocessor database system executing concurrent mergesorts according to a preferred embodiment of the present invention will be described. In the following description, it is assumed that in a multiprocessor database system multiple processor nodes 1 execute concurrent mergesorts by sharing multiple workfile disks 6. Each processor node 1 includes buffer memory 5 for storing the workfiles for sorting and merging. Each processor node 1 also includes a central processing unit (CPU) 4 which executes mergesorts under control of a workfile manager 2. The adaptive logical partitioning scheduler 3 is used by the workfile manager 2 to appropriately allocate workfile disks to a mergesort job initiated from a processor node 1. The processor node 1 can be embodied using any well known processor of adequate performance for the required system response time.

During a sorting phase, the data to be sorted which is stored in other data disks (not shown in FIG. 1), are fetched into the buffer 5, sorted into runs, and then written each run to one of the workfile disks 6. After the sorting phase, these runs are fetched back into the buffer 5, merged and then written back to the workfile disks 6. The adaptive logical partitioning scheduler 3 determines the way workfile disks 6 are used by a sort job. The workfile disks 6 are logically partitioned into groups. Each sort job selects one group that is least loaded and uses the group of disks to do the mergesort. The monitoring of disk utilization is done by system utilities and is outside the scope of this invention. The group size can be changed dynamically and hence is adaptive to the system workload, such as the avenge utilization of workfile disks.

In order to have better load balancing, runs should be distributed evenly among all the disks. Namely, the entire workfile disks can be viewed as a single partition. FIG. 2(a) shows an example of one partition, where workfile disks 20–27 are viewed as a single partition. Assume that there are two sort jobs J and K currently being executed. Each job has 5 runs after the sorting phase, denoted by J.0, . . . , J.4 and K.0, . . . K.4, respectively. The output runs of J and K are denoted by Jo and Ko, respectively. Because the length of Jo is the sum of J.0, . . . , J.4, we assume that it is partitioned into multiple segments, denoted by Jo.0, . . . , Jo.4, with each segment about the size of one of its input runs. The output run is spread among multiple workfile disks. Note that even though the output run Jo is placed on multiple disks, at any instant during the merge phase, there is only one disk that is actively performing the I/O for this output run. Similarly, during the sorting phase, there is only one disk that is actively writing for an input run. Moreover, none of the disks used for the output run is active during the sorting phase. As a result, we place the input runs of all the mergesorts in a round-robin fashion and the first segment of the output run of a mergesort job is placed right next to the disk that is used for its last input run. For example, in FIG. 2(a) the first input run of job K and the first segment of the output run of job J are both placed on workfile disk 25.

Even though using a single partition can achieve the best load balancing among workfile disks, it can create severe I/O interference between different sort jobs. For example, in FIG. 2(a) job J can be blocked waiting for a read I/O from workfile disk 22, which stores run J.2, because workfile disk 22 is currently serving a write I/O request from job K. Since write requests are hatched requests consisting of substantially larger amount of data than each read request, many such write requests may be issued continuously to the same disk. If the read request from Job J is blocked, it can be blocked for a long time. Once this read is blocked, job J is blocked because it cannot proceed without the data. Note that this problem cannot be solved simply by giving a higher priority to read requests because data of the output run will start accumulating in the buffer, leaving little space for the read requests. So, the merge process can also be blocked. Such an I/O interference problem is unique in the context of concurrent mergesorts in a multiprocessor system.

However, the average sort performance may be improved if the workfile disks are logically partitioned into multiple groups and each sort job chooses one group to perform the sorting. FIG. 2(b) shows an example of partitioning the workfile disks into two groups. Workfile disks 30–33 are in one group while workfile disk 34–37 are in another group. In this case, jobs J and K use a different group and thus I/O interference from these two jobs is eliminated. However, in general them may be some disk groups that are not being used for sorting at some point in time while other groups are overloaded. For instance, job K may not be active until job J is almost done in the embodiment of the invention of FIG. 2(b). As a result, during the execution of job J, only 4 disks are active while the other 4 are idle, resulting in load imbalance among the disks.

Note that besides the severe blocking between different jobs, there may also be some self-blocking. But, the self-blocking of a read I/O by a write I/O from the same job, such as a read I/O for J.0 and a write I/O for Jo.3 on disk 30 in FIG. 2(b), is substantially less severe because without the data read from J.0, there is no further data to be written for Jo.3. Thus, the time for self-blocking is relatively short. But, it can be very long if the blocking occurs between different jobs (J and K).

Figure 3:
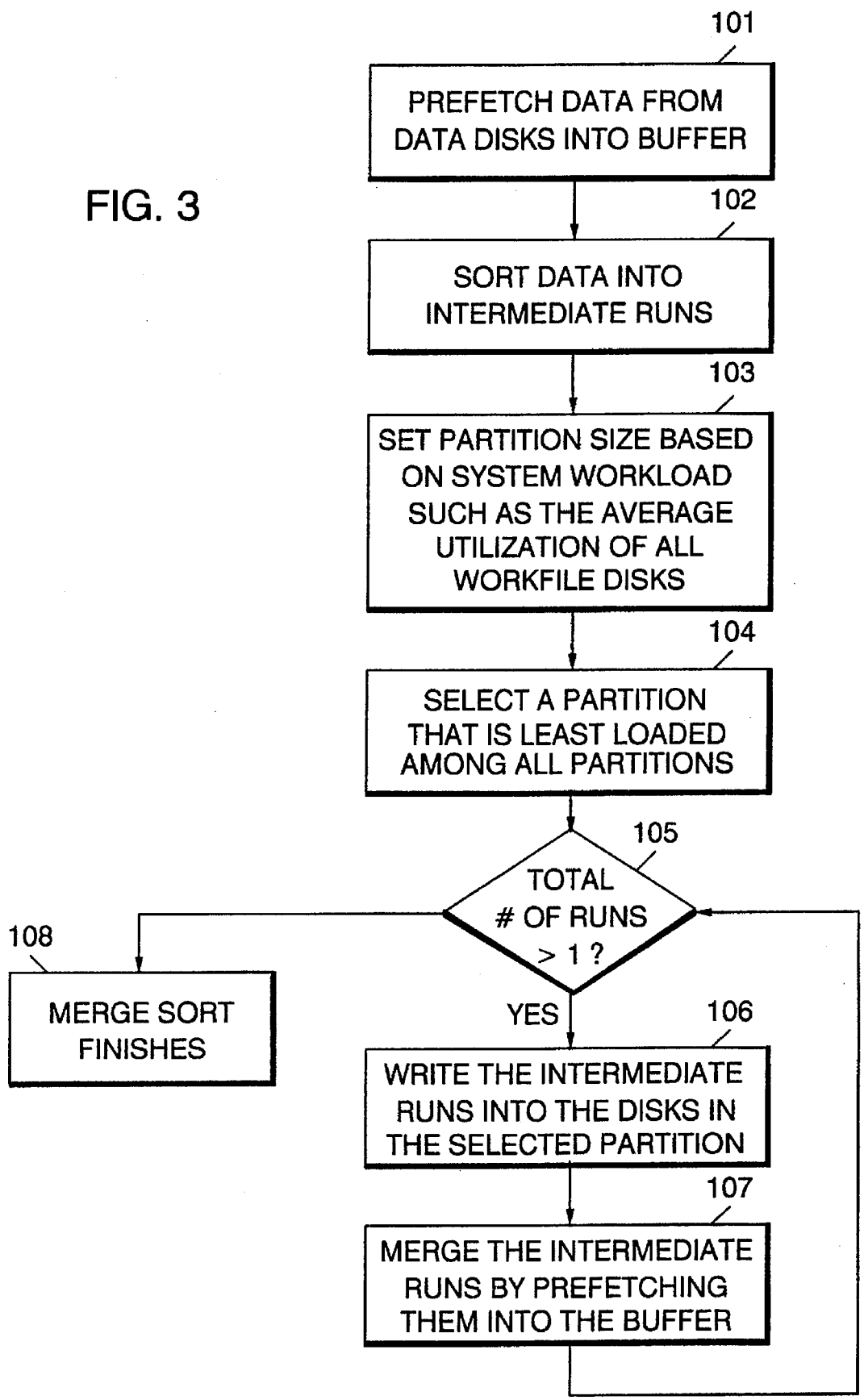
FIG. 3 is a flow diagram of an adaptive logical partitioning of workfile disks for performing a mergesort by a processor node in a multiprocessor database system according to the present invention.

Referring now to FIG. 3, the method of completing a mergesort at one processor node with adaptive logical partitioning of workfile disks according to the present invention will be described. First, the data to be sorted are prefetched into the buffer 5 from the data disks 6 (101), and sorted into intermediate runs (102). Then the processor 1 sets the logical partition size (or the number of logical partitions) based on the dynamic system workload, such as the average utilization of all the workfile disks 6 (103). For example, if the average workfile utilization is currently very low, for example less than 15%, then the entire set of workfile disks 6 can be viewed as a single partition. If the utilization is modest, for example, between 15% and 40%, the entire set of workfile disks 6 can be used as two partitions. If the utilization is rather high, for example, greater than 40%, then four partitions can be used. After the partition size is determined, a least loaded partition can be selected (104). The workfile disks 6 in this selected partition will be used for the merge phase of the mergesort. The mergesort finishes after the total number of sorted runs is equal to one (108). If the number of runs is still greater than one, then these intermediate runs are first written onto the workfile disks 6 in the selected partition (106). Then they are prefetched into the buffer 5 again and merged (107) until the final run is produced.

Note that to merge M input runs, at least the M active pages, one from each input run, must be in the buffer 5. These active buffer pages are pinned in the buffer 5, and cannot be replaced until unpinned after the data are depleted by the merge process. A page is pinned in a buffer when that page can not be replaced from the buffer by another page. When one of the active pages is depleted, a request is issued for the next page from the same run. If the page is already in the buffer 5, then the page is pinned and the merge process continues. Otherwise, a synchronous read is issued and the merge process enters into a wait state until the read I/O is completed.

Also note that prefetching can be used to speed up the fetching of data both in the sorting and merge phases. In addition to prefetching on reads, the I/O efficiency can also be improved by deferring and batching the disk write requests. This is referred to as deferred writes. During both the sorting phase and the merge phase, dirty pages are generated in the buffer 5. A dirty page is an output of either the sort phase or the merge phase. They are written to the workfile disks 6 via deferred writes.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

What is claimed is:

1. An information handling system for improving response time of multiple, concurrent mergesort operations, comprising:

a plurality of logical processors each operating under control of an image of an operating system program;

a database storage system for storing data in a predetermined data structure;

one or more workfile storage devices for storing workfiles during mergesort operations;

means for sharing one or more of said workfile storage devices by one or more of said logical processors; and means for executing a plurality of mergesort operations, wherein each mergesort operation is executed on a separate logical processor and wherein said means for executing each mergesort operation comprises:

means for sorting said data structure into one or more ordered runs;

means for determining a logical partition size for said workfile storage devices;

means for selecting a least loaded partition;

means for writing said one or more ordered runs into said workfile storage devices in said selected partition; and means for merging said one or more ordered runs into a single sorted run.

2. An information handling system for improving response time of concurrent mergesort operations, according to claim 1, further comprising:

means for partitioning said workfile storage devices into one or more groups.

3. An information handling system for improving response time of concurrent mergesort operations, according to claim 1, wherein said means for determining a logical partition size further comprises:

means for dynamically modifying said logical partition size based on system workload characteristics.

4. An information handling system for improving response time of concurrent mergesort operations, according to claim 3, wherein said system workload characteristics comprise an indicator of average utilization of said workfile storage devices.

5. An information handling system for improving response time of concurrent mergesort operations, according to claim 1, further comprising:

means for managing a plurality of concurrent mergesort requests.

6. A method for improving response time of multiple, concurrent mergesort operations, in an information handling system having a database storage system with a predetermined data structure, comprising the steps of:

providing a plurality of logical processors each operating under control of an image of an operating system program;

providing one or more workfile storage devices for storing workfiles during mergesort operations;

sharing one or more of said workfile storage devices by one or more of said logical processors; and executing a plurality of mergesort operations, wherein each mergesort operation is executed on a separate logical processor and wherein, for each mergesort operation, said executing comprises the steps of:

sorting said data structure into one or more ordered runs;

determining a logical partition size for said workfile storage devices;

selecting a least loaded partition;

writing said one or more ordered runs into said workfile storage devices in said selected partition; and merging said one or more ordered runs into a single sorted run.

7. A method for improving response time of concurrent mergesort operations, according to claim 6, further comprising the step of:

partitioning said workfile storage devices into one or more groups.

8. A method for improving response time of concurrent mergesort operations, according to claim 6, further comprising the step of:

dynamically modifying said logical partition size based on system workload characteristics.

9. A method for improving response time of concurrent mergesort operations, according to claim 8, wherein said system workload characteristics comprise an indicator of average utilization of said workfile storage devices.

10. A method for improving response time of concurrent mergesort operations, according to claim 6, further comprising the step of:

managing a plurality of concurrent mergesort requests.

* * * * *